United States Patent Office 2,984,855
Patented May 23, 1961

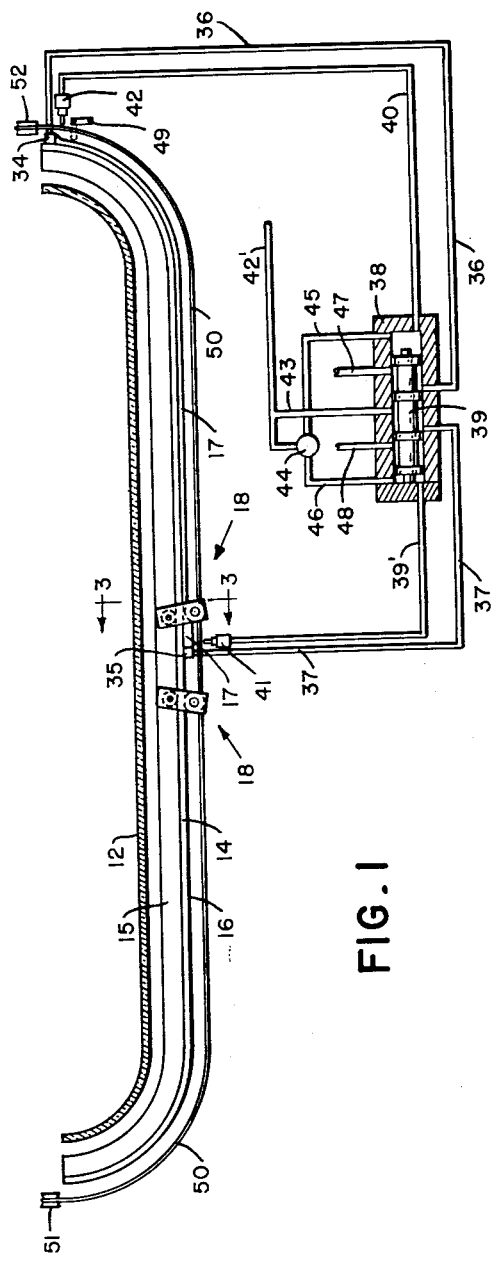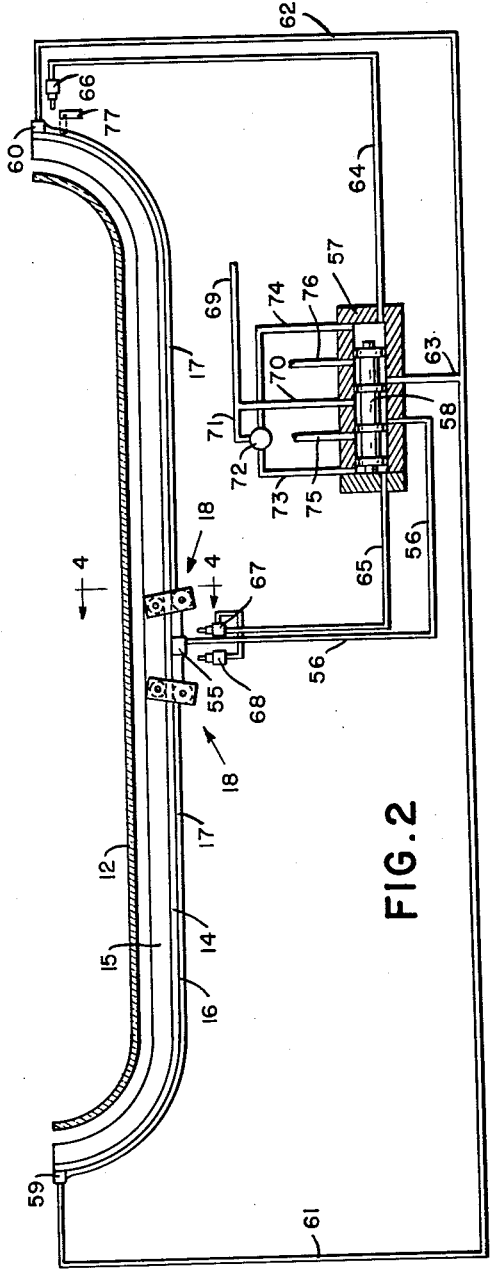

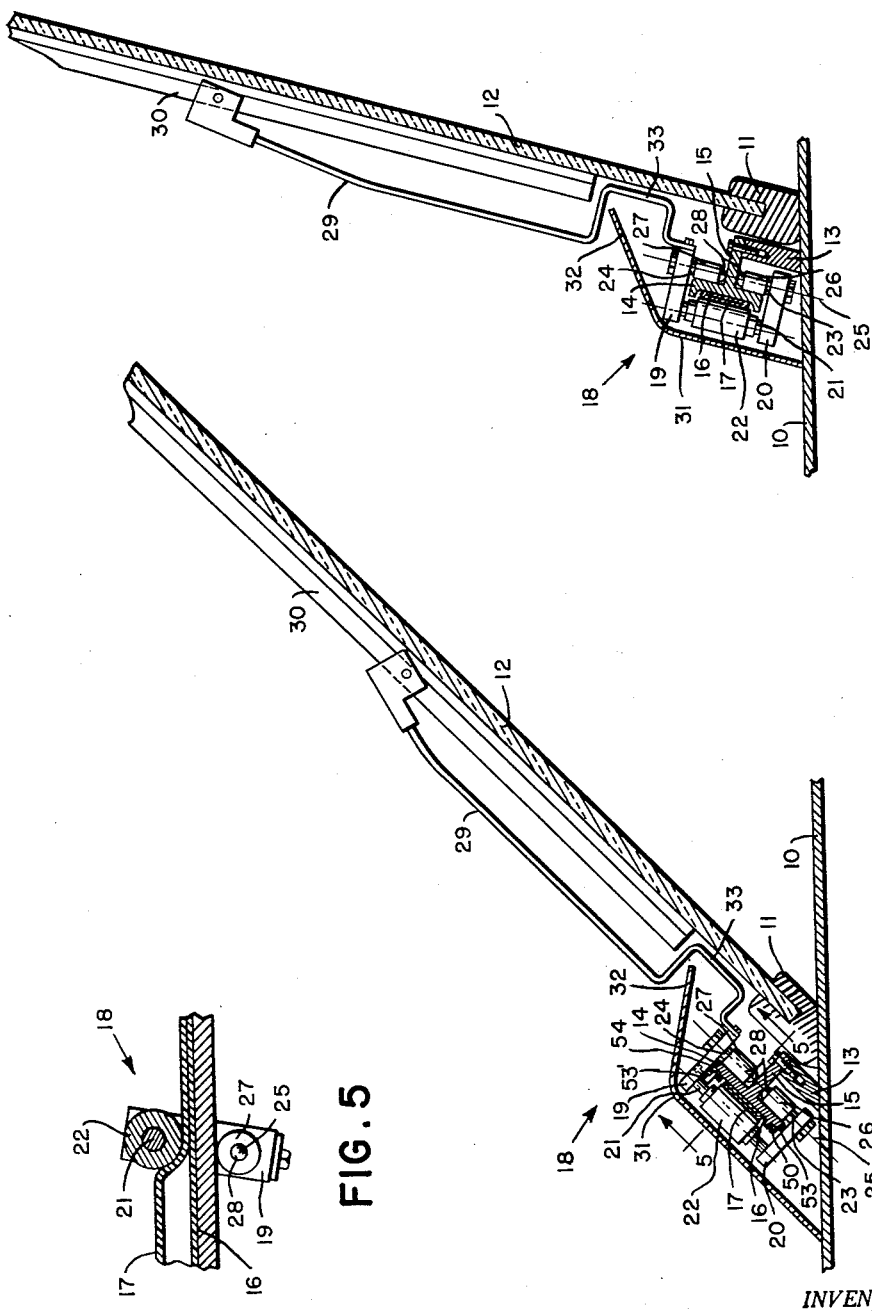

2,984,855
WINDSHIELD WIPER
Jerome L. Murray, 445 E. 58th St., New York, N.Y.
Filed July 2, 1958, Ser. No. 746,183
17 Claims. (Cl. 15—250.29)

The present invention relates to windshield wipers, and particularly to a new and improved windshield wiper that will be effective over substantially the entire windshield regardless of any curved portions thereof.

Presently employed windshield wipers of the oscillating type that move the wiper blade in an arcuate path are effective over only a small percentage of the windshield area and then only on flat surface portions thereof. Reciprocating windshield wipers are available but they are incapable of acting on curved windshield surfaces, particularly those of the modern cars that are commonly referred to as "wrap around" windshields.

The principal object of this invention is to provide a windshield wiper that is effective over substantially the entire surface area of the windshield regardless of pitch or compound curved portions thereof.

Another object of this invention is to provide a windshield wiper that employs fluid under pressure within a flexible, collapsible hose to move a truck or carriage along a support or track for the hose that may be straight, curved, compound curved, or any combination thereof.

Another object of the invention is to provide such a windshield wiper in which the resistance to movement of the wiper blade increases the efficiency of the fluid operated propelling means.

Another object of this invention is to provide such a windshield wiper that will employ two wiper blades each adapted to be effective over substantially the entire area of separate halves of the windshield.

Another object of this invention is to provide such a two-bladed wiper device in which the operation of each is maintained in phase or unison with that of the other.

Another object of the invention is to provide such a windshield wiper in which a truck or carriage for the wiper blade includes a presser roll that cooperates with a supporting member to collapse a flexible hose, supported by the supporting member, at the point along the supporting member where the carriage is located, the truck or carriage being arranged to tilt in a direction of carriage travel to thereby increase the collapsing effect of the presser roll.

Another object of this invention is to provide such a wiper blade mechanism in which fluid under pressure is alternately supplied to a flexible, collapsible hose on opposite sides of a carriage having a presser roll that collapses the hose so that the pressure fluid acts to propel the carriage along the hose.

One aspect of the invention may be to provide a substantially rigid supporting member that may be fixed to the car cowl and may follow the path of travel of the windshield wiper blade. A flexible, collapsible hose may be supported by the supporting member. In one embodiment of the invention, a portion of the outer surface of the hose may be integrally attached to the supporting member which may take the form of a track along which a carriage or truck is to be propelled. A presser roll may be journaled in pendants and held against the hose to effect its substantially complete collapse by other rollers journaled in the pendants and acting on an opposed surface of the track or supporting member from that to which the flexible hose is integrally attached.

In another aspect of the invention, the supporting member may extend throughout the length of the windshield and two wiper blade carriages may be mounted on the supporting member for movement over only one-half of the windshield. A flexible, collapsible hose may be employed with only one-half of the supporting member for propelling only one of the carriages, and a cable may be employed for causing another carriage mounted on the other half of the supporting member to move in unison with the propelled carriage.

In another aspect of the invention, separate duplicate flexible, collapsible hose members may be attached to separate halves of the supporting member for separately propelling a carriage along its corresponding half of the supporting member.

In another aspect of the invention, means may be provided for alternately supplying fluid under pressure to opposite ends of the flexible, collapsible hose members including means for maintaining the movement of the carriages in phase relation.

The above as well as other objects and novel features of the invention will become apparent from the following specification and accompanying drawings, which are merely exemplary.

In the drawings:

Figure 1 is a sectional plan view of a windshield and wiper blade mechanism to which the principles of the invention have been applied;

Fig. 2 is a sectional plan view of a windshield and wiper blade mechanism of modified form to which the principles of the invention have been applied;

Fig. 3 is a sectional elevational view taken substantially along line 3—3 of Fig. 1;

Fig. 4 is a sectional elevational view taken substantially along line 4—4 of Fig. 2, but shown with the carriage in its stored position at the extreme end of its path of travel; and Fig. 5 is a sectional elevational view taken substantially along line 5—5 of Fig. 3.

Referring to Fig. 3, a cowl 10 of an automobile body may support a mounting gasket 11 in which is mounted a windshield 12 that may be formed of a plain, curved, or compound curved glass. In the embodiment disclosed, it is shown as a compound curved sheet of glass having a varying pitch and commonly referred to in the art as a "wrap around windshield."

A mounting member 13 may be located in a plane parallel to that including the windshield 12 and may extend throughout substantially the length of the windshield, or it may comprise spaced mounting members along a line in such a parallel plane.

A supporting member which in the embodiment shown is in the form of a track 14 having a substantially T-shaped cross-section includes a flange 15 and a right-angularly disposed supporting surface 16. The flange 15 may be bolted or otherwise rigidly fixed to the mounting member 13 so that the top surface of track 14 lies in a plane substantially parallel with the plane including the windshield 12.

A flexible, collapsible hose 17 may have a portion of its surface in contact with the top surface of member 16, integrally attached by an adhesive, by vulcanizing or otherwise integrally joined thereto. Although the supporting member is shown supporting the flexible hose on the outside thereof, it could with facility extend interiorly through the hose and be hermetically sealed to the ends thereof.

A carriage 18 may include parallel arms 19 and 20 having an axle 21 extending therebetween and on which may be journaled a presser roll 22. Separate studs 23 and 24 may be fixed to arms 19 and 20 along a common transverse axis 25, and separate rolls 26 and 27 may be journaled, respectively, on the studs 23 and 24 in a manner to engage the lower surface of member 16 on each side of the flange 15. The distance between the axis of axle 21 and the axis 25 may be such as to effect substantially complete collapse of the flexible hose 17.

In order to guide the carriage laterally along the track 16, the inner ends of studs 23 and 24 may be provided with semi-spherical seats for receiving balls 28 and for holding them in contact with the opposed parallel surfaces of the flange 15. This arrangement provides a dual function in that it will permit slight angular movement of the arms 19 and 20 about the axis 25, thereby permitting tilting of the carriage 18 for a purpose to be described later, and also permits free anti-frictional travel of the balls 28 along the flange 15 whether the carriage is tilted or not.

The flexible, collapsible hose 17 may be made in several ways. The construction of the hose may be such that it remains in collapsed condition when exhausted, but will expand to an expanded condition which may be cylindrical or less than cylindrical when it is internally subjected to pressure fluid. It may be made up of fabric embedded rubber material and may comprise a natural or synthetic rubber or other suitable flexible and resilient material, preferably having at least one layer of fabric, cord or the like embedded therein. The flexible and resilient material hose also may be of braided metal construction or other types of metal hose and the term "flexible" is meant to include such herein.

A small area of the hose 17 in contact with the track 16 on each side of its longitudinal centerline may be integrally connected to the track by an adhesive, by vulcanizing, or by soldering if the hose is metal, or by any other suitable attaching means.

A wiper blade mounting arm 29 may be fixed to the carriage 18 for movement therewith. It may preferably be attached to the carriage 18 on the side of the track 16 of the axis 25 of the rolls 26 and 27 for a purpose to be described later. A flexible wiper blade 30 may be pivotally attached or otherwise mounted on the arm 29 so as to wipingly contact the outer surface of the windshield 12.

Referring to Fig. 5, introduction of pressure fluid to the interior of hose 17 on the lefthand side of carriage 18 will cause it to expand, and exhausting the hose 17 on the righthand side of carriage 18 will leave it in a collapsed condition. Furthermore, the pressure of the fluid within the hose 17 on the lefthand side of carriage 18 will cause the latter to tilt about the axis 25 in the direction of carriage propulsion, thereby increasing the pinching effect between the presser roll 22 and the track member 16. Additionally, any increase of resistance to carriage movement caused by the frictional engagement of the blade 30 on the windshield 12 will further add to the tilting action of carriage 18, thereby further increasing the pinching action above referred to.

A trim molding 31 may be fixed to the cowl 10 and may encase the track member 16 and carriage 18 throughout the extent of its travel. It may be provided with a portion 32 that cooperates with an offset portion 33 of the arm 29 to provide as little clearance between it and the windshield 12 as is possible and still permit free movement of arm 29 throughout its path of motion.

Referring to Fig. 1, the flexible hose 17 is shown as extending over only one-half of the length of the track 15, 16, and is provided with end fittings 34 and 35 at each end thereof. The end fittings 34 and 35 include connections to lines 36 and 37, respectively, which lead to a valve housing 38. The valve housing 38 may include a spool 39 that floats within the housing 38. Opposite ends of the housing 38 may be connected to lines 39' and 40 leading, respectively, to normally closed exhaust valves 41 and 42. The valves 41 and 42 include spring pressed plungers which when depressed exhaust the corresponding lines 39' and 40.

A supply line 42' directs pressure fluid to valve housing 38 through a line 43, and a reducing valve 44 bleeds pressure fluid to each side of spool 39 within housing 38 through lines 45 and 46. With the apparatus in the condition shown in Fig. 1, pressure fluid passes through line 37 to fitting 35 and inflates hose 17 on the lefthand side of the carriage 18 on the right half of the track 15, 16, while the line 36 is open to an exhaust line 47. This causes the carriage 18 to be propelled rightwardly. When the carriage 18 reaches its righthand extremity, it depresses the plunger of valve 42, causing line 40 to exhaust and consequently exhausting the end of housing 38 on the righthand side of spool 39. Since pressure fluid is present in the end of housing 38 to the left of spool 39, the latter moves to its righthand position, thereby causing pressure fluid from line 43 to pass through line 36, while line 37 is open to an exhaust line 48. Accordingly, the carriage 18 reverses its motion, moving leftwardly until it depresses the plunger of valve 41 whereupon the motion of carriage 18 is again reversed.

When it is desired to stop the windshield wiping action, a finger 49 may be provided which can be pivoted into the path of travel of carriage 18 at its righthand extremity of movement just prior to the carriage depressing the plunger of valve 42, thus leaving the hose 17 inflated to the left of carriage 18 and holding the latter in a stored, inconspicuous position adjacent the frame at the righthand end of the windshield 12. Additionally, since the hose 17 remains inflated, vibrations and wind will not disturb this stored condition of the wiper blade, which otherwise might cause it to creep from its stored position. An alternative arrangement to stop and lock the carriage 18 would be to provide a manually controlled valve in line 40 to prevent exhausting of the right end of cylinder 38, thereby to prevent the return of the carriage 18 when it strikes the valve 42.

When it is desired to restart the windshield wiper, the finger 49 need only be moved to its solid line position when carriage 18 will move rightwardly a small distance, actuating valve 42 and restarting the reciprocating action of the carriage 18.

That which has been described with respect to Fig. 1 covers only one-half of the length of the windshield 12. In order to clean the other half, another carriage 18 may be mounted on the track 15, 16 on the left hand half of the windshield 12. In the embodiment shown in Fig. 1, no flexible hose is provided for propelling the lefthand carriage 18. In order to propel this lefthand carriage 18 in unison with that of the righthand carriage, a continuous cable 50 may be supported by pulleys 51 and 52 at each extremity of the windshield 12 and it may ride in tracks 53 and 54 (see Fig. 3) formed along the track member 16. The righthand carriage 18 may be held by a clamp to the one strand of cable 50, while the lefthand carriage may be held by a similar clamp to the other strand of cable 50. Accordingly, any movement of the righthand carriage 18 will provide an equal movement in the opposite direction to the lefthand carriage 18.

Referring to Fig. 2, the right and left hand carriages 18 are propelled in unison by separate flexible, inflatable hoses 17. The adjacent ends of the two hoses 17 are connected to a common distributor 55 that is connected to a line 56 leading to a valve housing 57 in which a spool 58 identical with spool 39 is located. The ends of the hoses 17 at the two extremities of the windshield 12 support separate fittings 59 and 60. Lines 61 and 62 leading from fittings 59 and 60 are connected to a common line 63 also leading to housing 57. Lines 64 and 65 lead from opposite ends of housing 57 to exhaust valves 66 and 67 similar to exhaust valves 41 and 42 of Fig. 1. An additional exhaust valve 68 is connected in series with valve 67 for a purpose to be described later.

Fluid under pressure may be supplied from a line 69 through a branch 70 to valve housing 57. A branch 71 may lead to a reducing valve 72, thence through lines 73 and 74 to the opposite ends of housing 57. Exhaust lines 75 and 76 similar to lines 47 and 48 of Fig. 1 may lead from the housing 57.

With the apparatus in the condition shown in Fig. 2, pressure fluid passes from line 70 through line 56 to fitting 55, thereby supplying the adjacent ends of hoses 17 with pressure fluid, and the opposite ends of the hoses 17 exhaust through lines 61, 62, 63 and 76. This causes the righthand carriage 18 to move rightwardly and the lefthand carriage to move leftwardly. When the righthand carriage 18 actuates valve 66, the righthand end of housing 57 is exhausted and spool 58 moves rightwardly since fluid pressure still acts on the lefthand side of spool 58. Accordingly, pressure fluid passes through lines 63, 62 and 61, reversing the motion of the carriages 18.

When the righthand carriage 18 reaches the position in its leftward travel to actuate valve 67, the line 65 will not be exhausted unless the lefthand carriage 18 has actuated the series connected valve 68. When this occurs, the motion of the carriages is again reversed. From the foregoing it is evident that means is provided for ensuring the operation of the carriages 18 in unison.

When it is desired to stop the windshield wiping action, it is only necessary to turn a finger 77 to its dotted line position; and, to restart the wiping action finger 77 need only be pivoted to its solid line position.

Although the various features of the new and improved windshield wiper have been shown and described in detail to fully disclose two embodiments of the invention, it will be evident that numerous changes may be made in such details, and certain features may be used without others without departing from the principles of the invention.

What is claimed is:

1. A windshield wiper comprising in combination, supporting means adapted to be mounted on the cowl of an automobile and to extend throughout substantially the length of the windshield thereof; a flexible, collapsible hose supported by said supporting means and substantially coextensive therewith; a carriage including a presser roll in contact with said collapsible hose; means for mounting said carriage on said supporting means in a manner to effect substantially complete collapsing of said hose at a point along said hose where said carriage is located, said mounting means including means responsive to fluid pressure in said hose for moving said presser roll toward said supporting means; means for supplying fluid under pressure to the one end of said hose while exhausting the other end thereof; and a wiper blade attached to said carriage.

2. A fluid operated windshield wiper comprising in combination, a supporting member; a flexible, collapsible hose supported by said supporting means; a carriage adapted to be propelled along said hose; means on said carriage for effecting the collapse of said hose at a point along said hose where said carriage is located; means for supplying fluid under pressure to the one end of said hose while exhausting the other end thereof, to thereby produce a propelling force to said carriage in the direction of the exhausted end of said hose; means responsive to the force exerted on said carriage by said pressurized hose for increasing the collapsing effect of said hose at the point along said hose where said carriage is located; and a wiper blade mounted on said carriage.

3. A fluid operated windshield wiper comprising in combination, a supporting member; a flexible, collapsible hose supported by said supporting member; a carriage adapted to be propelled along said hose; means on said carriage for effecting the collapse of said hose at a point along said hose where said carriage is located, said collapsing means including freely floating means on said carriage for journaling oppositely acting roller means for collapsing said hose; means for supplying fluid under pressure to the one end of said hose while exhausting the other end thereof, to thereby produce a propelling force to said carriage and a tilting action to said freely floating means in the direction of the exhausted end of said hose; and a wiper blade attached to said carriage.

4. A fluid operated windshield wiper comprising in combination, means defining a track; a flexible, collapsible hose extending along said track; a carriage adapted to be propelled along said track; means on said carriage for effecting the collapse of said hose at a point along said hose where said carriage is located; means responsive to pressure fluid within said hose for increasing the effect of said collapsing means; means for supplying fluid under pressure to the one end of said hose while exhausting the other end thereof, to thereby produce a propelling force to said carriage in the direction of the exhausted end of said hose; means responsive to said carriage arriving at a point near the exhaust end of said hose for rendering ineffective the pressure fluid within said hose; and a wiper blade attached to said carriage.

5. A fluid operated windshield wiper comprising in combination a flat, substantially rigid supporting means; a flexible, collapsible hose extending along said rigid supporting means and integrally attached thereto; a carriage adapted to be propelled along said hose; means on said carriage for effecting the collapse of said hose at a point along said hose where said carriage is located, said collapsing means including freely floating means on said carriage for journaling oppositely acting roller means for collapsing said hose; means for supplying fluid under pressure to the one end of said hose while exhausting the other end thereof, to thereby produce a propelling force to said carriage and a tilting action to said freely floating means in the direction of the exhausted end of said hose; and a wiper blade attached to said carriage.

6. A windshield wiper comprising in combination, supporting means adapted to be mounted on the cowl of an automobile and to extend throughout substantially the full length of the windshield thereof; a flexible, collapsible hose supported by said supporting means and extending over substantially half the length of said windshield; a carriage including a presser roll in contact with said flexible hose; means for mounting said carriage on said supporting means for limited pivotal movement of said presser roll against said flexible hose and in a manner to effect substantially complete collapsing of said hose at the point where said carriage is located; means for supplying fluid under pressure alternately to opposite ends of said hose and for alternately exhausting the other ends of said hose; another carriage mounted on said supporting means on the remaining half of said supporting means; means responsive to the movement of said first carriage for moving said other carriage means; and a wiper blade attached to each of said carriages.

7. A windshield wiper comprising in combination, supporting means adapted to be mounted on the cowl of an automobile and to extend throughout substantially the full length of the windshield thereof; a flexible, collapsible hose supported by said supporting means and extending over substantially half the length of said windshield; a carriage including a presser roll in contact with said flexible hose; means for mounting said carriage on said supporting means for limited pivotal movement of said presser roll against said flexible hose and in a manner to effect substantially complete collapsing of said hose at the point where said carriage is located; valve means adapted to be rendered effective by the arrival of said carriage at substantially each end of said hose for supplying pressure fluid to one end and for exhausting the other end of said hose; another carriage mounted on said supporting means on the remaining half of said supporting means; means responsive to the movement of said first carriage for moving said other carriage means; and a wiper blade attached to each of said carriages.

8. A windshield wiper comprising in combination, supporting means adapted to be mounted on the cowl of an automobile and to extend throughout substantially the full length of the windshield thereof; a flexible, collapsible hose supported by said supporting means and extending over substantially half the length of said windshield; a carriage including a presser roll in contact with said flexible hose; means for mounting said carriage on said supporting means for limited pivotal movement of said presser roll against said flexible hose and in a manner to effect substantially complete collapsing of said hose at the point where said carriage is located; valve means adapted to be rendered effective by the arrival of said carriage at substantially each end of said hose for supplying pressure fluid to one end and for exhausting the other end of said hose; manually operable means for arresting said carriage prior to one of said valve means being rendered effective; another carriage mounted on said supporting means on the remaining half of said supporting means; means responsive to the movement of said first carriage for moving said other carriage means; and a wiper blade attached to each of said carriages.

9. A windshield wiper comprising in combination, supporting means adapted to be mounted on the cowl of an automobile and to extend throughout substantially the length of the windshield thereof; a flexible, collapsible hose supported by said supporting means; a carriage including a presser roll in contact with said collapsible hose; means for mounting said carriage on said supporting means in a manner to effect substantially complete collapsing of said hose at a point along said hose where said carriage is located, said mounting means including means responsive to fluid pressure in said hose for moving said presser roll toward said supporting means; valve means adapted to be rendered effective by the arrival of said carriage at substantially each end of said hose for supplying pressure fluid to one end and for exhausting the other end of said hose; and a wiper blade attached to said carriage.

10. A windshield wiper comprising in combination, supporting means adapted to be mounted on the cowl of an automobile and to extend throughout substantially the length of the windshield thereof; a flexible, collapsible hose supported by said supporting means; a carriage including a presser roll in contact with said collapsible hose; means for mounting said carriage on said supporting means in a manner to effect substantially complete collapsing of said hose at a point along said hose where said carriage is located, said mounting means including means responsive to fluid pressure in said hose for moving said presser roll toward said supporting means; valve means adapted to be rendered effective by the arrival of said carriage at substantially each end of said hose for supplying pressure fluid to one end and for exhausting the other end of said hose; manually operable means for arresting said carriage prior to said valve means being rendered effective; and a wiper blade attached to said carriage.

11. A windshield wiper comprising in combination, supporting means adapted to be mounted on the cowl of an automobile and to extend throughout substantially the full length of the windshield thereof; flexible, collapsible hose means supported by said supporting means; two carriages mounted on said supporting means for movement over one half the length of said windshield, at least one of said carriages including a presser roll in contact with said flexible hose means; means for mounting said carriages on said supporting means for limited pivotal movement of the presser roll of at least one of said carriages against said flexble hose means and in a manner to effect substantially complete collapsing of said hose means at the point where said carriage is located; means for supplying pressure fluid alternately to opposite ends of said hose means and for alternately exhausting the other ends of said hose means, means for causing both of said carriages to move substantially in unison; and a wiper blade attached to each of said carriages.

12. A windshield wiper comprising in combination, supporting means adapted to be mounted on the cowl of an automobile and to extend throughout substantially the full length of the windshield thereof; flexible, collapsible hose means supported by said supporting means; two carriages mounted on said supporting means for movement over one half of the length of said windshield, at least one of said carriages including a presser roll in contact with said flexible hose means; means for mounting said carriages on said supporting means for limited pivotal movement of the presser roll of at least one of said carriages against said flexble hose means and in a manner to effect substantially complete collapsing of said hose means at the point where said carriage is located; valve means adapted to be rendered effective by the arrival of at least one of said carriages at substantially each end of its path of travel for supplying pressure fluid to one end of said hose and for exhausting the other end of said hose means; and a wiper blade attached to each of said carriages.

13. A windshield wiper comprising in combination, supporting means adapted to be mounted on the cowl of an automobile and to extend throughout substantially the full length of the windshield thereof; flexible, collapsible hose means supported by said supporting means; two carriages mounted on said supporting means for movement over one half of the length of said windshield, at least one of said carriages including a presser roll in contact with said flexible hose means; means for mounting said carriages on said supporting means for limited pivotal movement of the presser roll of at least one of said carriages against said flexble hose means and in a manner to effect substantially complete collapsing of said hose means at the point where said carriage is located; valve means adapted to be rendered effective by the arrival of at least one of said carriages at substantially each end of its path of travel for supplying pressure fluid to said hose means at one end and for exhausting the other end of said hose means; manually operable means for arresting said carriage prior to said valve means being rendered effective; and a wiper blade attached to each of said carriages.

14. A windshield wiper comprising in combination, supporting means adapted to be mounted on the cowl of an automobile and to extend throughout substantially the full length of the windshield thereof; separate flexible, collapsible hose means supported by said supporting means and extending over substantially separate halves of the length of said windshield; separate carriages for each half of said windshield, each including a presser roll in contact with its corresponding flexible hose means; means for mounting said carriages on said supporting means for limited pivotal movement of each presser roll against its corresponding flexible hose and in a manner to effect substantially complete collapsing of said corresponding hose at the points where said carriages are located; means for alternately supplying pressure fluid to opposite ends of each of said hose means, and for exhausting the other ends of said hose means; means for maintaining the movement of said carriages substantially in unison; and a wiper blade attached to each of said carriages.

15. A windshield wiper comprising in combination, supporting means adapted to be mounted on the cowl of an automobile and to extend throughout substantially the full length of the windshield thereof; separate flexible, collapsible hose means supported by said supporting means and extending over substantially separate halves of the length of said windshield; separate carriages for each half of said windshield, each including a presser roll in contact with its corresponding flexible hose means; means for mounting said carriages on said supporting means for limited pivotal movement of each presser roll against its corresponding flexible hose and in a manner to effect substantially complete collapsing of said corresponding hose at the points where said carriages are located; valve means adapted to be rendered effective by the arrival of one of said carriages at substantially each end of its path of travel for supplying pressure fluid to one end of its corresponding hose and for exhausting the other end thereof; and a wiper blade attached to each of said carriages.

16. A windshield wiper comprising in combination, supporting means adapted to be mounted on the cowl of an automobile and to extend throughout substantially the full length of the windshield thereof; separate flexible, collapsible hose means supported by said supporting means and extending over substantially separate halves of the length of said windshield; separate carriages for each half of said windshield, each including a presser roll in contact with its corresponding flexible hose means; means for mounting said carriages on said supporting means for limited pivotal movement of each presser roll against its corresponding flexible hose and in a manner to effect substantially complete collapsing of said corresponding hose at the points where said carriages are located; valve means adapted to be rendered effective by the arrival of one of said carriages at substantially each end of its path of travel for supplying pressure fluid to one end of its corresponding hose and for exhausting the other end thereof; manually operable means for arresting said carriage prior to one of said valve means being rendered effective; and a wiper blade attached to each of said carriages.

17. A windshield wiper comprising in combination, supporting means adapted to be mounted on the cowl of an automobile and to extend throughout substantially the full length of the windshield thereof; separate flexible, collapsible hose means supported by said supporting means and extending over substantially separate halves of the length of said windshield; separate carriages for each half of said windshield, each including a presser roll in contact with its corresponding flexible hose means; means for mounting said carriages on said supporting means for limited pivotal movement of each presser roll against its corresponding flexible hose and in a manner to effect substantially complete collapsing of said corresponding hose at the points where said carriages are located; valve means adapted to be rendered effective by the arrival of one of said carriages at substantially each end of its path of travel for supplying pressure fluid to one end of its corresponding hose and for exhausting the other end thereof; manually operable means for arresting said carriage prior to one of said valve means being rendered effective; means for causing both of said carriages to move substantially in unison; and a wiper blade attached to each of said carriages.

References Cited in the file of this patent

UNITED STATES PATENTS

| | | |
|---|---|---|
| 1,697,358 | Hueber | Jan. 1, 1929 |
| 1,886,812 | Hueber et al. | Nov. 8, 1932 |
| 2,596,000 | Weiss | May 6, 1952 |